(12) United States Patent
Hazelton

(10) Patent No.: US 6,313,551 B1
(45) Date of Patent: Nov. 6, 2001

(54) MAGNET ARRAY FOR A SHAFT-TYPE LINEAR MOTOR

(75) Inventor: Andrew J. Hazelton, San Carlos, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 09/498,570

(22) Filed: Feb. 4, 2000

(51) Int. Cl.[7] .................................................. H02K 41/00
(52) U.S. Cl. ............................................................... 310/12
(58) Field of Search ................................ 310/12, 13, 14, 310/42; 335/302, 306

(56) References Cited

U.S. PATENT DOCUMENTS

| | | | |
|---|---|---|---|
| 4,460,855 | 7/1984 | Kelly | 318/135 |
| 5,014,032 | * 5/1991 | Aubert | 335/306 |
| 5,019,863 | * 5/1991 | Quimby | 335/210 |
| 5,440,183 | * 8/1995 | Denne | 310/12 |
| 6,043,572 | * 3/2000 | Nagai et al. | 310/12 |

FOREIGN PATENT DOCUMENTS

| | | |
|---|---|---|
| 0878 899 A1 | 11/1998 | (EP) . |
| 6-038501 | 2/1994 | (JP) . |
| 10-313566 | 11/1998 | (JP) . |
| 11-294520 | 10/1999 | (JP) . |

OTHER PUBLICATIONS

Translation of Abstract for Japanese Patent 6–038501 (Complete non–translated reference previously submitted and translation of summary previously submitted).

Translation of Abstract for Japanese Patent 11–294520 (Complete non–translated reference previously submitted and translation of summary previously submitted).

Translation of Summary for Japanese Patent 6–038501.

Translation of Summary for Japanese Patent 11–294520.

Publication: IEEE Translations on Magnetics. vol. 35, No. 3. May 1999. "A General Framework for the Analysis and Design of Tubular Linear Permanent Magnet Machines." By Jiabin Wang, Geraint W. Jewell, and David Howe.

* cited by examiner

Primary Examiner—Nestor Ramirez
Assistant Examiner—Judson H. Jones
(74) Attorney, Agent, or Firm—Jim Rose; Steven G. Roeder

(57) ABSTRACT

A magnet array (20) for a shaft type linear motor (10) is provided herein. In one embodiment, the magnet array (20) includes a plurality of magnetic, axial sections (40) and a plurality of magnetic, transverse sections (42) positioned along an array axis (34) of the magnet array (20). Each axial section (40) has an axial polarization (52) relative to the array axis (34) and each transverse section (42) has transverse polarization (54) relative to the array axis (34). The resulting magnet array (20) has improved flux density for a given mass. In another embodiment, each magnetic section (36) of the magnet array (20) includes a first channel (60) and a second channel (62) that extends inward from the sides (44,46) of each section (36). The resulting magnet array (20) has a reduced mass for a given flux density. Importantly, for each embodiment, the magnet array (20) has an improved ratio of flux density to magnet mass. This allows the magnet array (20) and the motor (10) to be more efficient.

85 Claims, 11 Drawing Sheets

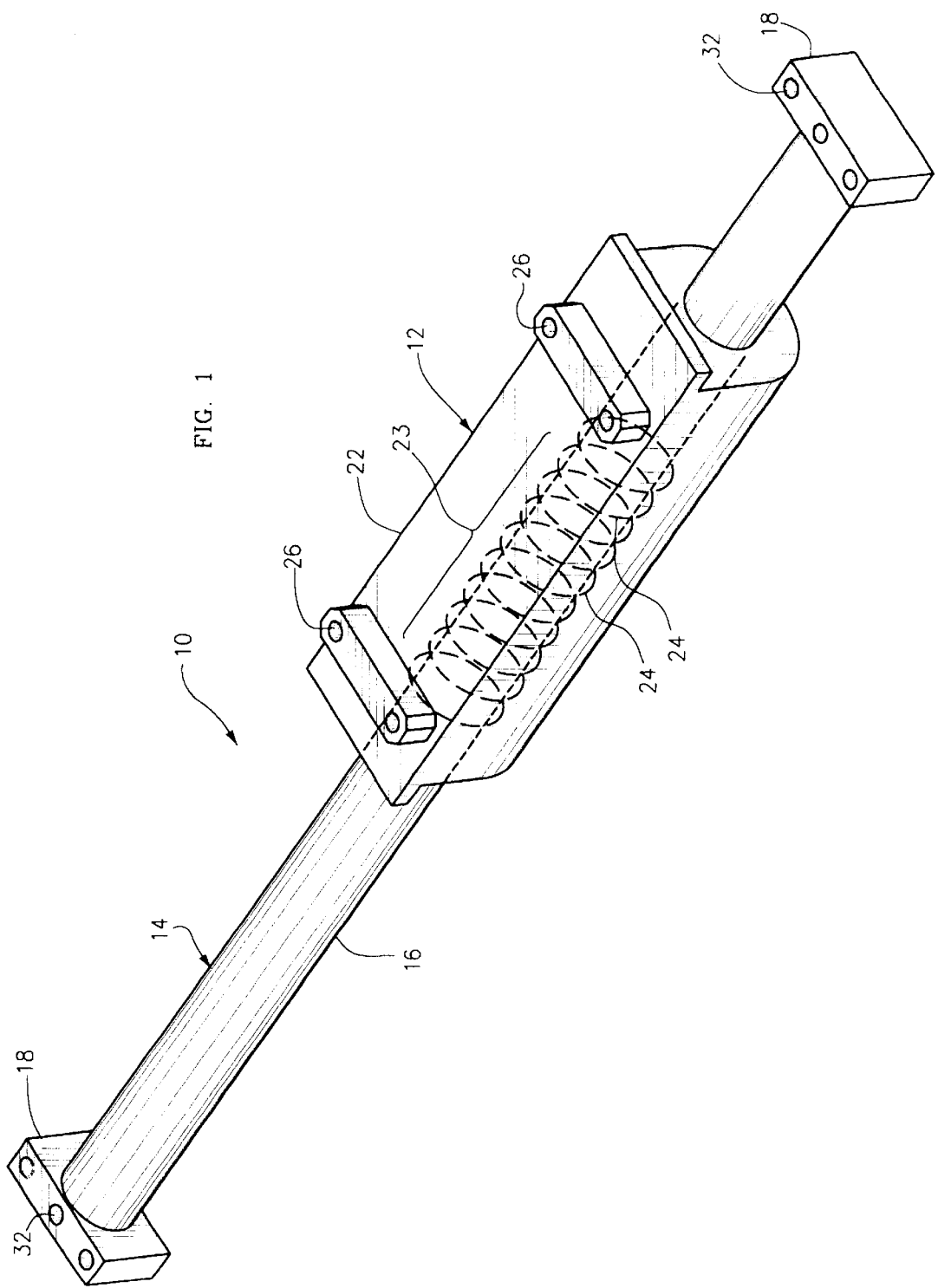

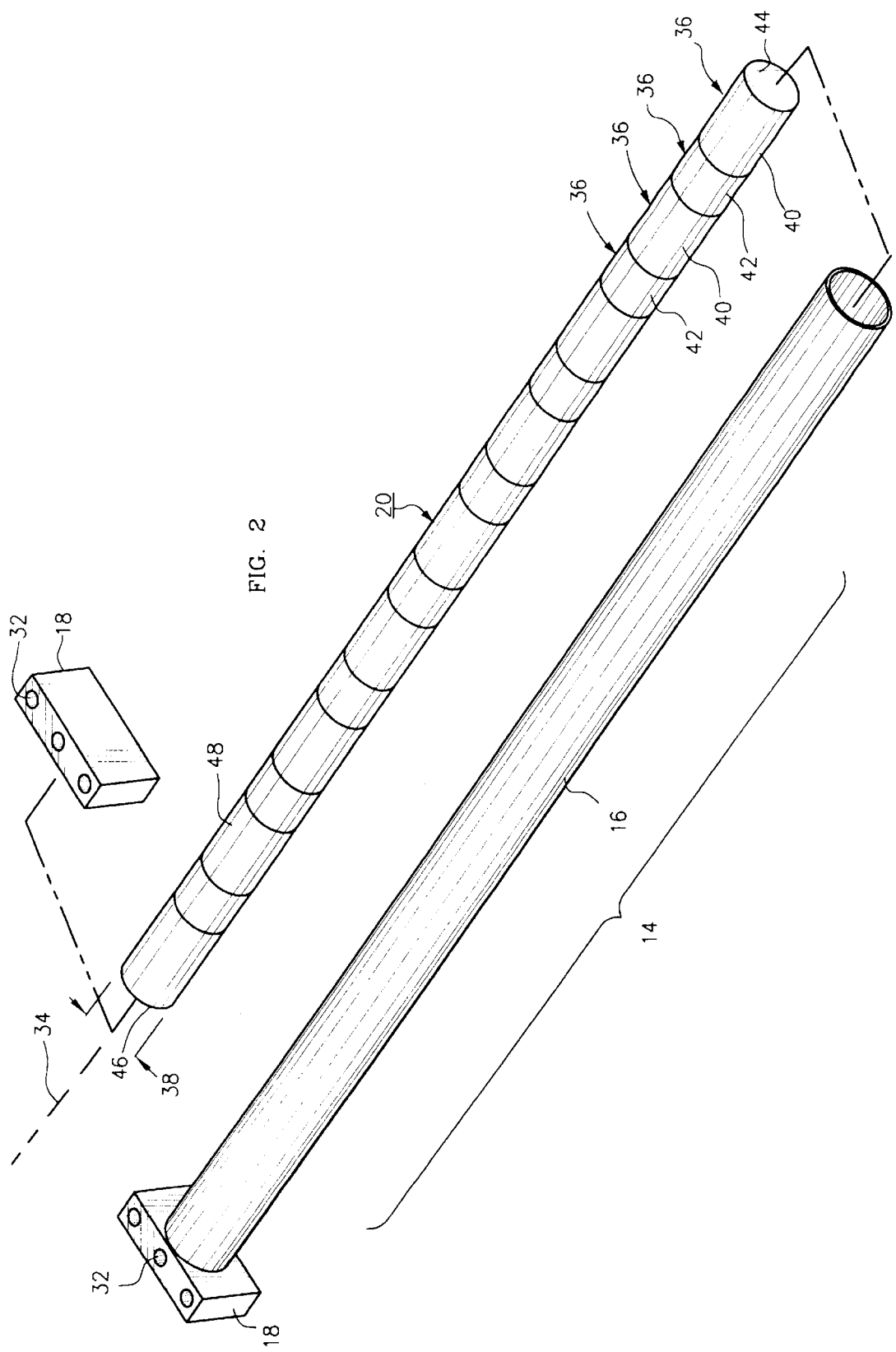

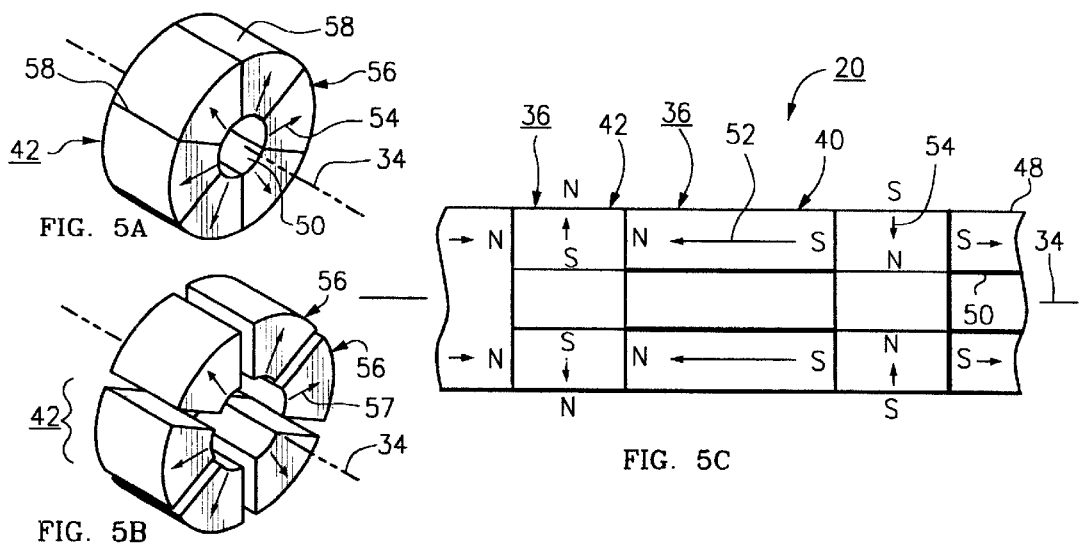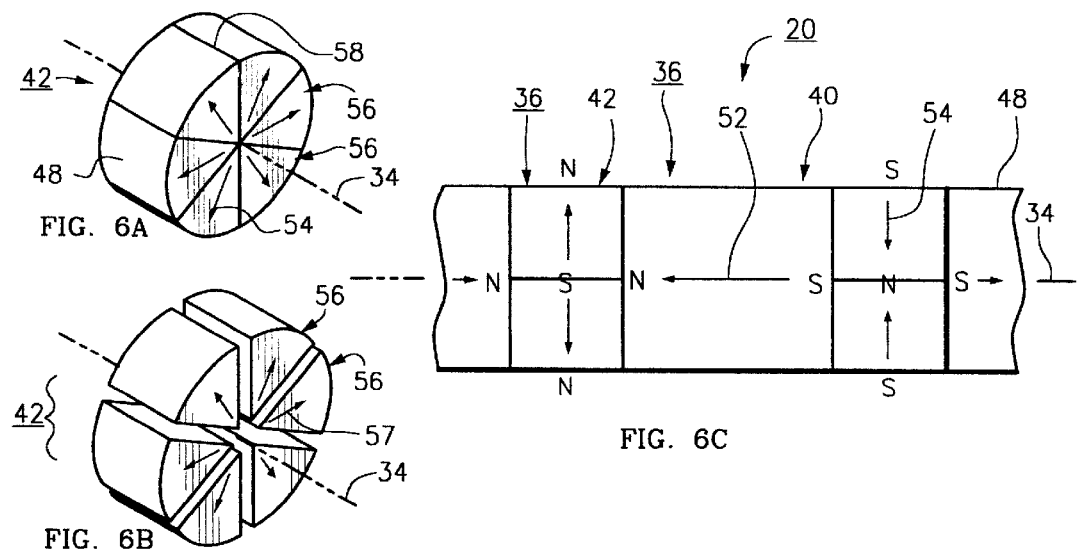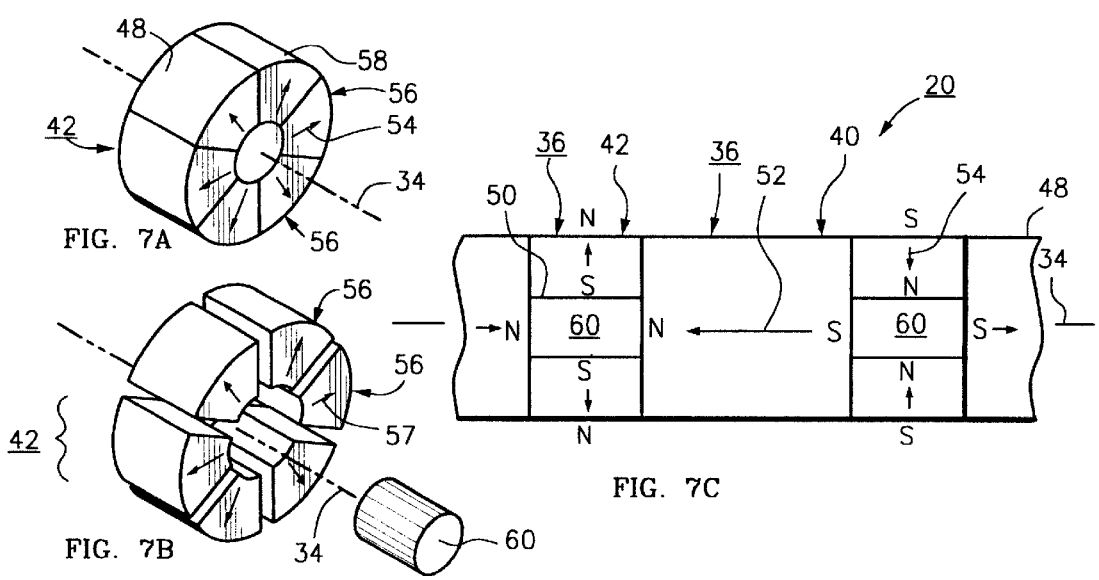

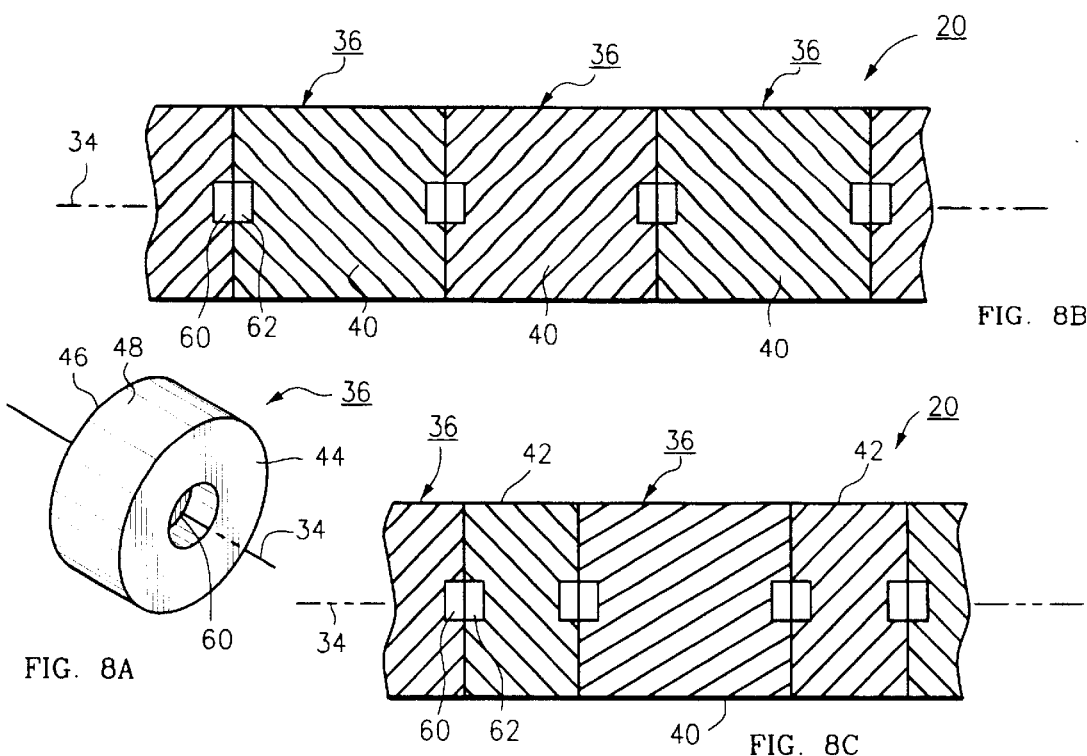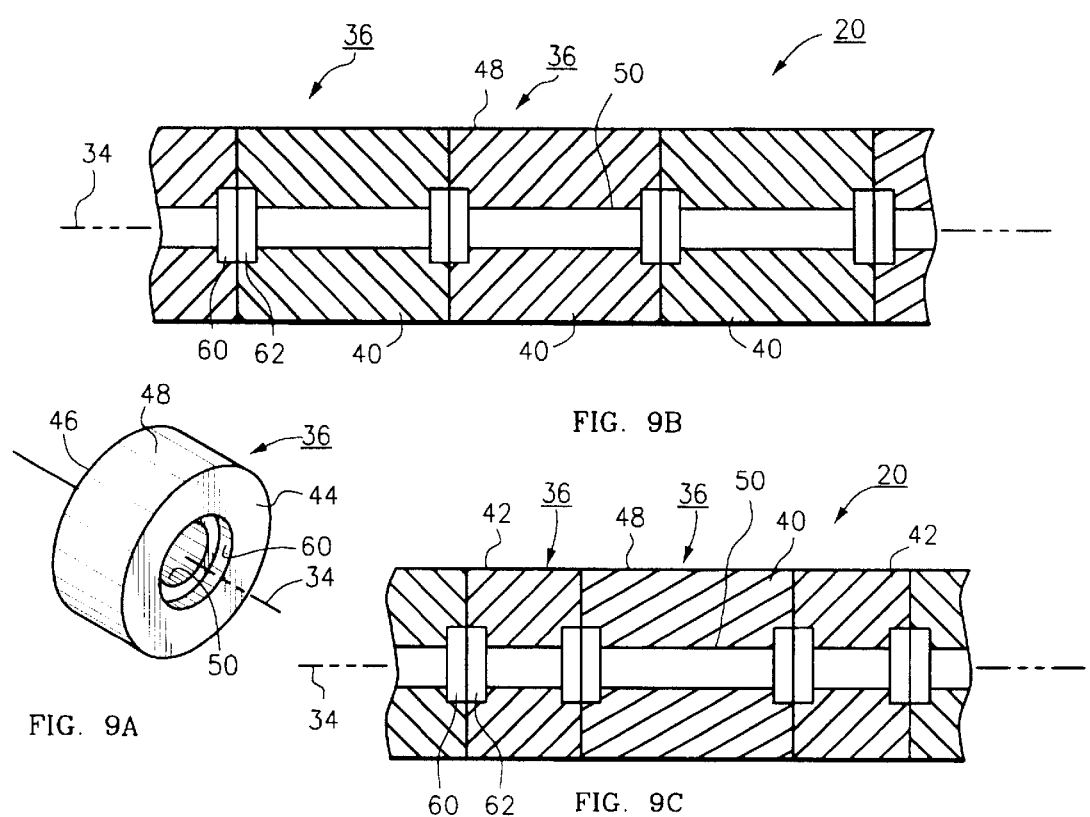

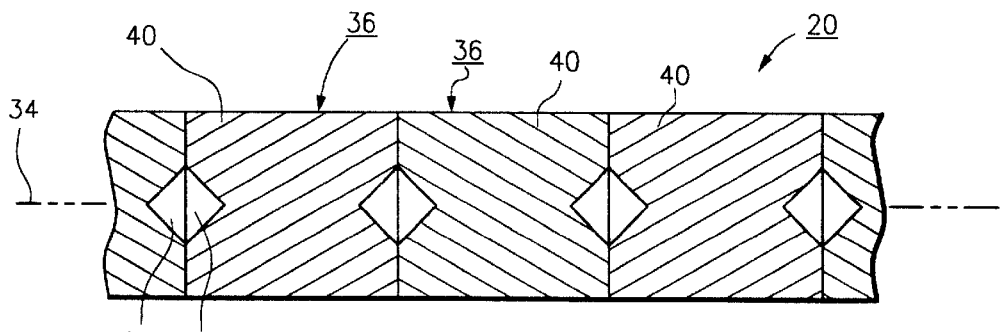
FIG. 10B
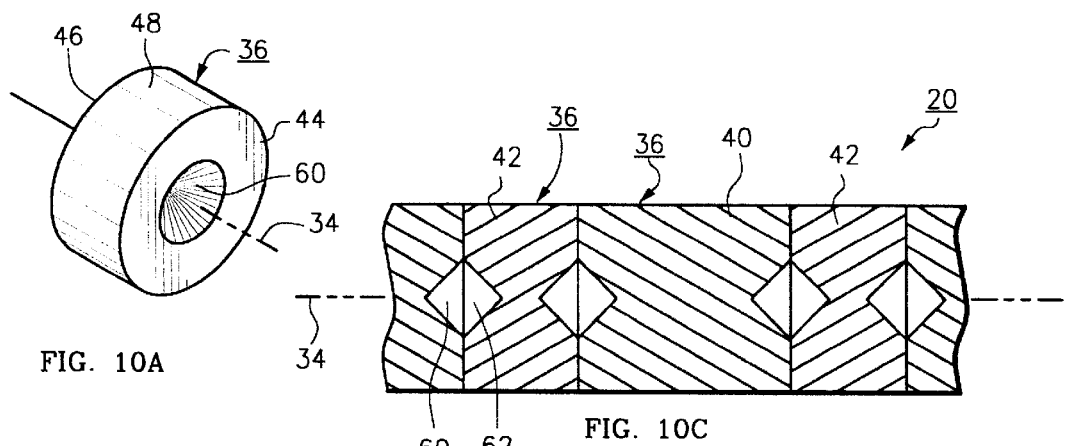
FIG. 10A
FIG. 10C
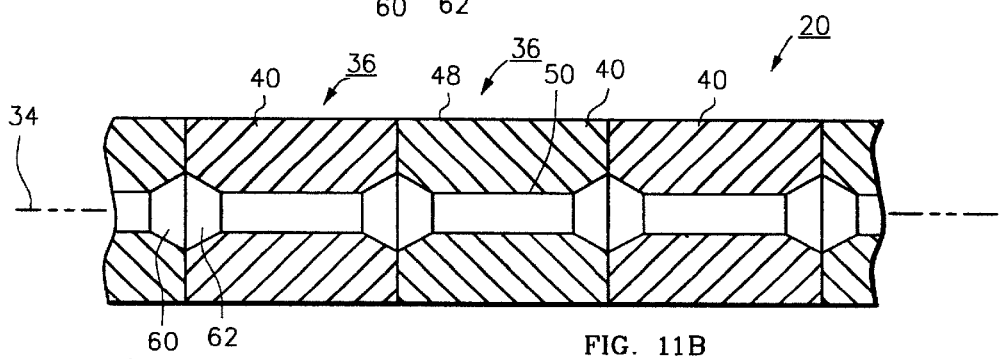
FIG. 11B
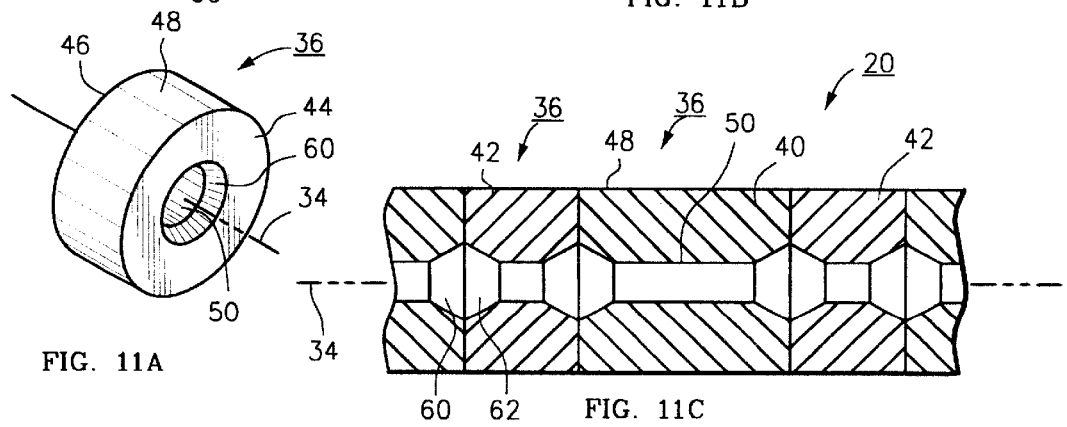
FIG. 11A
FIG. 11C

MAGNET ARRAY FOR A SHAFT-TYPE LINEAR MOTOR

FIELD OF THE INVENTION

The present invention is directed to linear motors. More specifically, the present invention is directed to magnet arrays for a shaft-type linear motor. The magnet arrays provided herein have an improved ratio of flux density to magnet mass.

BACKGROUND

Linear motors are used in a variety of electrical devices. For example, photolithography systems and other semiconductor processing equipment utilize linear motors to precisely position a wafer stage holding a wafer. Alternately, linear motors are used in other devices, including elevators, electric razors, machine tools, metal cutting machines, inspection machines, and disk drives.

A typical shaft-type linear motor includes a magnet array and a coil array. The magnet array includes a plurality of magnets positioned side-by-side. The magnets generate a magnetic field. Each magnet is cylindrical shaped and includes a longitudinal axis and a pair of opposed sides. Typically, each magnet is axially polarized relative to the longitudinal axis. Stated another way, the opposite poles are located on the opposed sides of each of the magnets.

The coil array includes a plurality of coils that are individually supplied with an electrical current. The electric current supplied to the coils generates an electromagnetic field. The electromagnet field interacts with the magnetic field of the magnet array. This causes the coil assembly to move relative to the magnet array. When the coil array is secured to the wafer stage, the wafer stage moves in concert with the coil array.

One of the factors that influences the performance of a shaft-type linear motor is the performance of the magnet array. The performance of the magnet array can be characterized by the ratio of the flux density of the magnetic field of the magnet array to the mass of the magnet array. The ratio between the flux density and the mass shall be referred to herein as the ("flux/mass ratio"). A high flux/mass ratio indicates an efficient magnet array.

In light of the above, an object of the present invention is to provide a magnet array for a linear motor having an improved flux/mass ratio. It is another object of the present invention to provide a method for increasing flux density without significantly increasing the mass of the magnet array. Another object of the present invention is to provide a method for decreasing the mass without significantly decreasing the flux density. Yet another object of the present invention is to provide a linear motor that dissipates less power for a given force.

SUMMARY

The present invention is directed to a magnet array that interacts with a coil array of a motor. A number of embodiments of the magnet array are provided herein. Importantly, in each embodiment, the magnet array has an improved flux/mass ratio. This improves the performance of the motor.

In one embodiment, the magnet array includes one or more magnetic, transverse sections positioned along an array axis of the magnet array. Each transverse section has a polarization that is transverse or radial to the array axis of the magnet array. High energy product, rare earth magnets cannot be easily radially polarized. The present invention solves this problem by assembling a plurality of linearly polarized, individual segments to make each transverse section. More specifically, for each transverse section, the segments are positioned together so that the polarization of the transverse section is transverse or radial to the array axis of the magnet array. Because of this design, the segments and each transverse section can be made of a high energy product, rare earth, magnetic material.

The magnet array can also include one or more magnetic, axial sections positioned along the array axis. Each axial section has an axial polarization relative to the array axis. Preferably, the magnet array includes a plurality of alternating axial sections and transverse sections positioned side-by-side along the array axis. As a result of this design, the magnet array has an improved flux density, without significantly affecting the mass of the magnet array. Thus, the magnet array has an improved flux/mass ratio.

In another embodiment, the magnet array also includes a plurality of magnetic sections positioned side-by-side along the magnet array. Each section includes a first side and an opposed second side. In this embodiment, magnetic material from the magnet array that is not generating flux that interacts with the coil array is removed from each section. More specifically, as a result of the removed material, each section includes a first channel and a second channel. The first channel extends from the first side into only a portion of the section and the second channel extends from the second side into only a portion of the section. Each channel is substantially centered on the array axis. As a result of the channels in each section, the magnet array has a decreased magnet mass, with only a negligible decrease in flux density. Thus, the magnet array has an improved flux/mass ratio.

For the embodiments provided herein, each magnetic section is typically, either substantially, right cylindrical shaped or substantially tubular shaped. Further, the embodiments can be combined. For example, the axial sections and the transverse sections can each include first and second channels to reduce the mass of the magnet array.

The present invention is also directed to a number of methods for manufacturing a magnet array with an improved flux/mass ratio. One method includes the step of manufacturing a magnetic transverse section having a polarization that is substantially transverse to the array axis. Another method includes the steps of providing a magnetic plurality of sections, and creating a first channel in at least one of the sides of at least one of the sections.

Additionally, the present invention is directed to a method for making a linear motor, a method for making an exposure apparatus that forms an image from a first object onto a second object, and a method for making a device utilizing the exposure apparatus.

Importantly, the magnet arrays provided herein have an improved flux/mass ratio. In some embodiments, the magnet array has increased flux density for a given magnet mass. Alternately, in some embodiments, the magnet array has a decreased magnet mass for a given flux density. In either case, the resulting motor is more efficient and dissipates less power for a given force.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 1 is a perspective view of a shaft-type linear motor having features of the present invention;

FIG. 2 is an exploded, perspective view of a magnet assembly having features of the present invention;

FIG. 5A is a perspective view of a first embodiment of a transverse section of the magnet array;

FIG. 5B is an exploded perspective view of the transverse section of FIG. 5A;

FIG. 5C is a cross-sectional view of a portion of a magnet array including the transverse section of FIG. 5A;

FIG. 6A is a perspective view of a second embodiment of the transverse section;

FIG. 6B is an exploded perspective view of the transverse section of FIG. 6A;

FIG. 6C is a cross-sectional view of a portion of a magnet array including the transverse section of FIG. 6A;

FIG. 7A is a perspective view of a third embodiment of the transverse section;

FIG. 7B is an exploded perspective view of the transverse section of FIG. 7A;

FIG. 7C is a cross-sectional view of a portion of a magnet array including the transverse section of FIG. 7A;

FIG. 8A is a perspective view a section having features of the present invention;

FIG. 8B is a cross-sectional view of a portion of a magnet array including the section of FIG. 8A;

FIG. 8C is a cross-sectional view of a portion of another magnet array including the section of FIG. 8A;

FIG. 9A is a perspective view of another embodiment of a section having features of the present invention;

FIG. 9B is a cross-sectional view of a portion of a magnet array including the section of FIG. 9A;

FIG. 9C is a cross-sectional view of a portion of another magnet array including the section of FIG. 9A;

FIG. 10A is a perspective view of another embodiment of a section having features of the present invention;

FIG. 10B is a cross-sectional view of a portion of a magnet array including the section of FIG. 10A;

FIG. 10C is a cross-sectional view of a portion of another magnet array including the section of FIG. 1 OA;

FIG. 11A is a perspective view of another embodiment of a section having features of the present invention;

FIG. 11B is a cross-sectional view of a portion of a magnet array including the section of FIG. 11A;

FIG. 11C is a cross-sectional view of a portion of another magnet array including the section of FIG. 11A;

DESCRIPTION

Figure 3A:
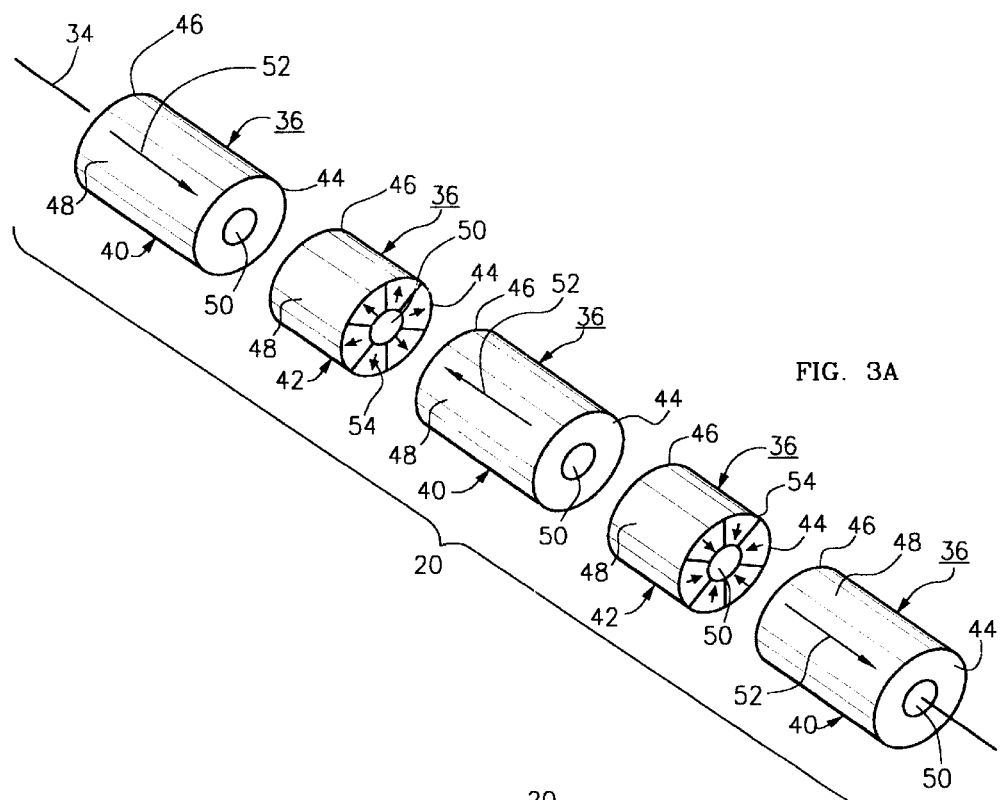
FIG. 3A is an exploded perspective view of a portion of a first embodiment of a magnet array having features of the present invention.

FIG. 1 illustrates an electric motor 10 having features of the present invention. As provided below, the motor 10 is particularly useful as part of an exposure apparatus 21 (illustrated in FIG. 13). The electric motor 10 illustrated in FIG. 1 is a shaft-type linear motor and includes a coil assembly 12 and a magnet assembly 14. Referring to FIG. 2, the magnet assembly 14 includes a magnet housing 16, a pair of end caps 18, and a magnet array 20.

The present invention provides a number of embodiments of the magnet array 20. In each embodiment, the magnet array 20 has an improved flux/mass ratio. Depending upon the embodiment, the magnet array 20 can have an increased flux density for a given mass and/or a decreased mass for a given flux density. As a result thereof, the magnet array 20 is more efficient, the motor 10 is more efficient and the motor 10 dissipates less power for a given force.

The design of the coil assembly 12 can be varied to suit the design requirements of the motor 10. In the embodiment illustrated in FIG. 1, the coil assembly 12 encircles a portion of the magnet housing 16 and is designed to move relative to magnet housing 16 along the magnet housing 16. Alternately, for example, for a shaft-type linear motor, (i) the coil assembly 12 could be encircled by the magnet assembly 14, (ii) the magnet assembly 14 could move relative to the coil assembly 12 and/or (iii) the coil assembly 12 and magnet housing 16 could have a rectangular shaped cross-section.

The coil assembly 14 includes a coil housing 22 and a coil array 23 (shown in phantom in FIG. 1) having a plurality of tubular coils 24 (shown in phantom in FIG. 1) positioned within the coil housing 22. Each coil 24 typically includes a plurality of electrical wires (not shown) encapsulated in an epoxy. Electrical current (not shown) is supplied to each individual coil 24. The electrical current in the coils 24 interacts with a magnetic field 25 (illustrated in FIGS. 3B and 4B) generated by the magnet array 20. This causes a force between the coils 24 and the magnet array 20 which can be used to move the coils 24 relative to the magnet assembly 14.

The coil housing 22 illustrated in FIG. 1 includes a right cylindrical shaped cavity (not shown) for receiving the coil array 23. Further, the coil housing 22 includes a plurality of housing attachers 26 for securing the coil housing 22 to the object 28 (illustrated in FIG. 12) to be moved by the motor 10. In the embodiment illustrated, each housing attacher 26 is an internally threaded aperture in the coil housing 22. Alternately, for example, each housing attacher 26 could be an externally threaded member (not shown).

The design of the magnet housing 16 and end caps 18 can be varied to suit the design requirements of the motor 10. The magnet housing 16 illustrated in FIGS. 1 and 2 is sized and shaped to receive the magnet array 20 and fit within the coil housing 22. The magnet housing 16 illustrated is tubular shaped.

The end caps 18 are attached to the ends of the magnet housing 16 and retain the magnet array 20 within the magnet housing 16. Additionally, the end caps 18 secure the motor 10 to the desired mounting surface 30 (illustrated in FIG. 12). In the embodiment illustrated in FIGS. 1 and 2, each end cap 18 is rectangular shaped and includes three cap attachers 32 for securing the motor 10 to the mounting surface 30. Each cap attacher 32 can be an aperture that extends through the end cap 18 as illustrated in the Figures. Alternately, for example, each cap attacher 26 can include an externally threaded member (not shown) or an internally threaded surface (not shown). The end caps 18 are secured to the magnet housing 16 with a weld (not shown) or other suitable means.

The design of the magnet array 20 can be varied to suit the design requirements of the motor 10. A number of alternate magnet arrays 20 are provided herein. Each magnet array 20 illustrated includes an array axis 34 and a plurality of magnetic sections 36, i.e. individual magnets, positioned side-by-side along the array axis 34. For an exposure apparatus 21, the magnet array 20 typically includes between fourteen and twenty-two sections 36. The magnet array 20 illustrated in FIG. 2 includes seventeen, right, cylindrical shaped sections 36 and each section 36 has an outer diameter 38 of between approximately 30 mm and 60 mm. However, the number of sections 36, and the size and shape of the sections 36 can be varied to suit the design requirements of the motor 10. For example, each section 36 could have a tubular shaped cross-section or a rectangular shaped cross-section.

Figure 3B:
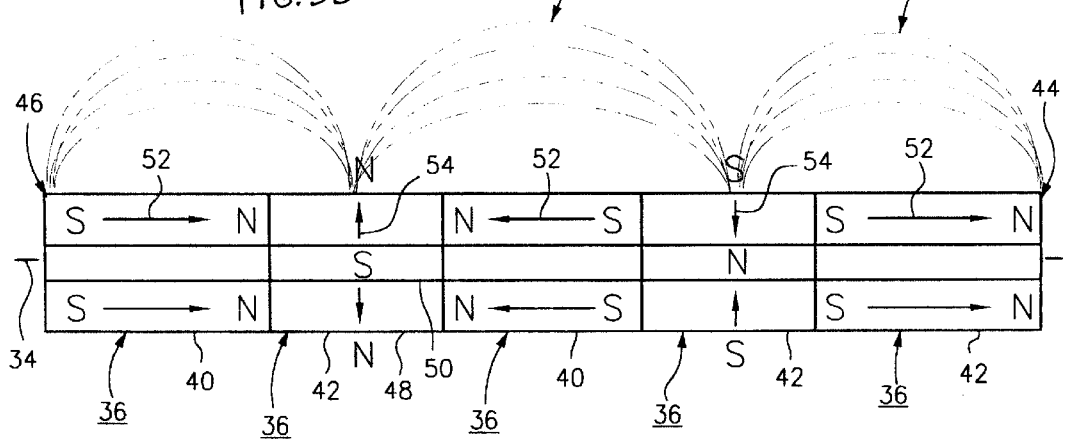
FIG. 3B is a cross-sectional view of the portion of the magnet array of FIG. 3A assembled.

FIGS. 3A and 3B illustrate a portion of a magnet array 20 having features of the present invention. FIG. 3A illustrates an exploded, perspective view of the magnet array 20 while FIG. 3B illustrates a cross-sectional view of the magnet array 20. A portion of the magnetic field 25 generated by the magnet array 20 is illustrated in FIG. 3B.

Importantly, all of the magnetic sections 36 of the magnet array 20 illustrated in FIGS. 3A and 3B are not the same. More specifically, some of the sections 36 of the magnet array 20 are magnetic, axial sections 40 and some of the sections 36 are magnetic, transverse sections 42. The axial sections 40 and the transverse sections 42 are alternately positioned side-by-side along the array axis 34. In FIGS. 3A and 3B, each section 36 is substantially tubular shaped and includes a first side 44, an opposed second side 46, an outer perimeter 48 and an inner perimeter 50.

Each axial section 40 is characterized by axial polarization 52 (represented by arrows) that is substantially parallel with the array axis 34. Stated another way, for each axial section 40, one of the sides 44, 46 is the north pole (designated "N" in the Figures) while the other side 44, 46 is the south pole (designated "S" in the Figures). Each transverse section 42 has transverse polarization 54 (represented by arrows). Stated another way, the polarization of each transverse section 42 is substantially transverse and more specifically, radial to the array axis 34. For each transverse section 42, one of the perimeters 48, 50 is orientated as the north pole while the other perimeter 48, 50 in orientated as the south pole. As illustrated in FIGS. 3A and 3B, each axial section 40 can be longer than each transverse section 42.

The magnet array 20 illustrated in FIGS. 3A and 3B includes a total of five sections 36. However, the number of sections 36 can be decreased or increased following the same pattern illustrated. In particular, the axial sections 40 and transverse sections 42 are alternately stacked side-by-side along the array axis 34. Additionally, alternating axial sections 40 have opposite polarity while alternating transverse sections 42 also have opposite polarity.

Figure 4A:
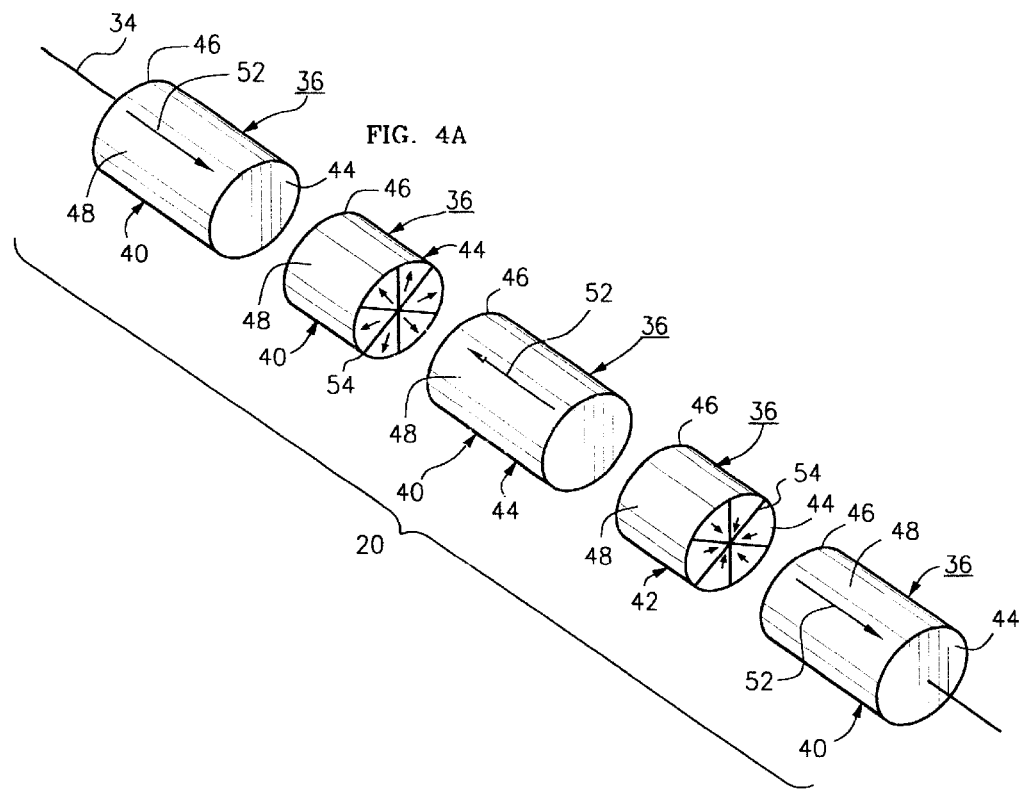
FIG. 4A is an exploded perspective view of a portion of a second embodiment of a magnet array having features of the present invention.
Figure 4B:
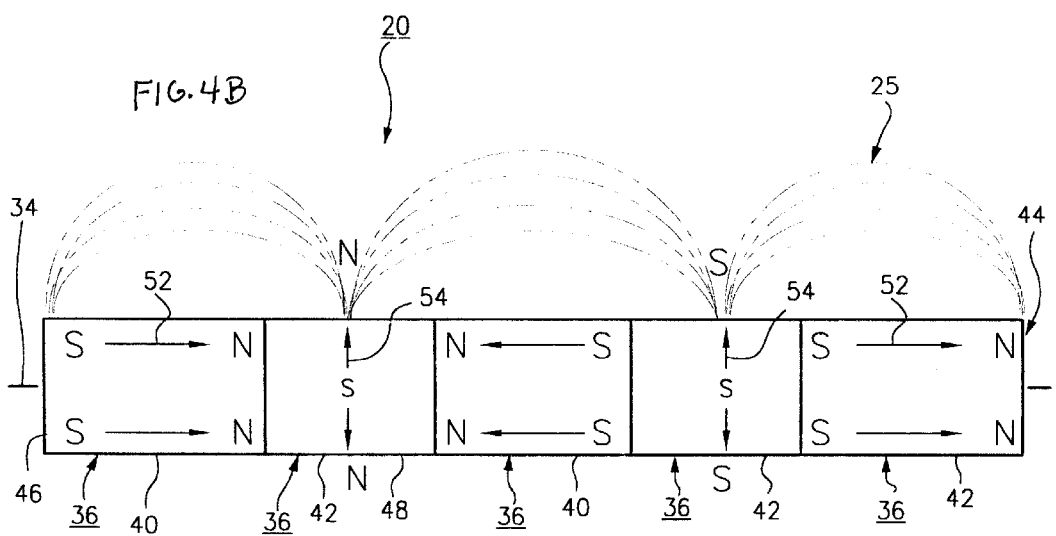
FIG. 4B is a cross-sectional view of the portion of the magnet array of FIG. 4A assembled.

FIGS. 4A and 4B illustrate another portion of a magnet array 20 having features of the present invention. FIG. 4A illustrates an exploded, perspective view of the magnet array 20, while FIG. 4B illustrates a cross-sectional view of the magnet array 20. A portion of the magnetic field 25 generated by the magnet array 20 is also illustrated in FIG. 4B. The embodiment illustrated in FIGS. 4A and 4B is similar to the embodiment illustrated in FIGS. 3A and 3B, except each section 36 in FIGS. 4A and 4B is substantially right cylindrical shaped.

The magnet array 20 illustrated in FIGS. 4A and 4B also includes a plurality of axial sections 40 and a plurality of transverse sections 42. Each axial section 40 is characterized by axial polarization 52 that is substantially parallel with the array axis 34. Each transverse section 42 has transverse polarization 54 that is transverse or radial to the array axis 34. In the embodiment illustrated in FIGS. 4A and 4B, for each transverse section 42, the outer perimeter 48 is orientated as one of the poles while the center of the transverse section 42 at the array axis 34 is orientated as the other pole. It should be noted from FIGS. 4A and 4B that alternating axial sections 40 along the array axis 34 have opposite plurality and alternating transverse sections 42 along the array axis 34 have opposite plurality.

High energy product, rare earth magnets cannot be easily radially polarized because of their anisotropic magnetization characteristics. The present design provides a way to effectively, radially polarize high energy product, rare earth magnets for each transverse section 42. High energy product as used herein shall mean greater than about 40 MGOe. Examples of high energy product, rare earth magnetic materials include NdFeB magnets, manufactured by Crucible Magnetics, located in Elizabethtown, Ky. Alternately, the present invention can utilize a low energy product, ceramic or other type magnet for each transverse section 42.

FIGS. 5A–C, 6A–C, and 7A–C illustrate three alternate embodiments of a transverse section 42 having features of the present invention. More specifically, FIGS. 5A, 6A, and 7A illustrate each transverse section 42 assembled. FIGS. 5B, 6B, and 7B each illustrate an exploded view of each transverse section 42. FIGS. 5C, 6C, and 7C each illustrate a portion of three alternate magnet arrays 20 including one of the transverse sections 42. The transverse sections 42 illustrated in FIGS. 5A–C is tubular shaped, while the transverse sections 42 illustrated in FIGS. 6A–C and 7A–C is right cylindrical shaped.

In each embodiment, each transverse section 42 includes a plurality of segments 56 which are secured together to form the transverse section 42. As provided herein, each individual segment 56 is linearly polarized 57 (illustrated in FIGS. 5B, 6B, and 7B). The segments 56 are arranged in a pattern about the array axis 34 so that the effective polarization of the set of segments 56 is radial to the array axis 34. In the embodiments illustrated in FIGS. 5A, 6A, and 7A, the outer perimeter 48 of each transverse section 42 is the north pole. Alternately, the outer perimeter 48 of each transverse section 42 could be the south pole.

The shape and number of segments 56 can be varied. In the embodiments illustrated, each segment 56 has a substantially wedge or pie shaped cross-section. Further, in the embodiments illustrated, each transverse section 42 includes six (6) individual segments 56. Alternately, for example, the number of segments 56 can be between four (4) and eight (8). The segments 56 can be held together with a retainer 58 to form each transverse section 42. An adhesive can be used as the retainer 58.

Additionally, a plug 60 illustrated in FIGS. 7A–7C can be positioned within the segments 56 to assist in retaining the segments 56 together. The plug 60 illustrated is right cylindrical shaped and preferably is made from a magnetic material, such as iron, or low carbon steel, i.e. 1010 steel.

The plug 60 is centered on the array axis 34. The plug 60 links the flux between the segments 56 and inhibits the segments 56 from separating due to their inherent repulsion.

FIGS. 8A, 9A, 10A, and 11A each illustrate a perspective view of an alternate embodiment of a section 36 which can be used with a magnet array 20. FIGS. 8B, 8C, 9B, 9C, 10B, 10C, 11B, and 11C each illustrate a cross-sectional view of an alternate magnet array 20. Similar to the embodiments described above, these magnet arrays 20 are characterized by a plurality of sections 36 positioned side-by-side along the array axis 34. In the embodiments illustrated in FIGS. 8B, 9B, 10B, and 11B, each section 36 in each magnet array 20 is an axial section 40. Alternately, in the embodiments illustrated in FIGS. 8C, 9C, 10C, and 11C, the sections 36 in each magnet array 20 are a combination of axial sections 40 and transverse sections 42. The shape of each section 36 can be varied. For example, in the embodiments illustrated in FIGS. 8A–C and 10A–C, each section 36 is substantially right cylindrical shaped. Alternately, in the embodiments illustrated in FIGS. 9A–C and 11A–C, each section 36 is substantially annular or tubular shaped.

In these embodiments, the mass of each section 36 is reduced, while maintaining substantially the same effective flux density. In order to accomplish the reduction in mass, a small region of each section 36 that is not generating magnetic flux 25 which will influence the coil array 23 (illustrated in FIG. 1) is removed. More specifically, as a result of the removed material, each section 36 includes a first channel 60 and a second channel 62. The first channel 60 extends into only a portion of the section 36 from the first side 44 while the second channel 62 extends into only a portion of the section 36 from the second side 46. Each channel 60, 62 is substantially centered on the array axis 34.

The shape of each channel 60, 62 can be varied. In the embodiments illustrated in FIGS. 8A–C and 9A–C, each channel 60,62 is cylindrical shaped, and in FIGS. 10A–C, 11A–C, each channel 60, 62 is cone-shaped. Further, the depth of each channel 60, 62 can be varied. For example, each channel 60, 62 can have a depth of between approximately 10 to 50 percent of the length of each section 36.

With the channels 60, 62, the resulting magnet array 20 has a lower mass with a very slight decrease in effective magnetic flux density. With the embodiments illustrated herein, finite element analysis shows a magnet mass reduction of approximately ten percent (10%) and a flux density decrease of only approximately three percent (3%).

Figure 12:
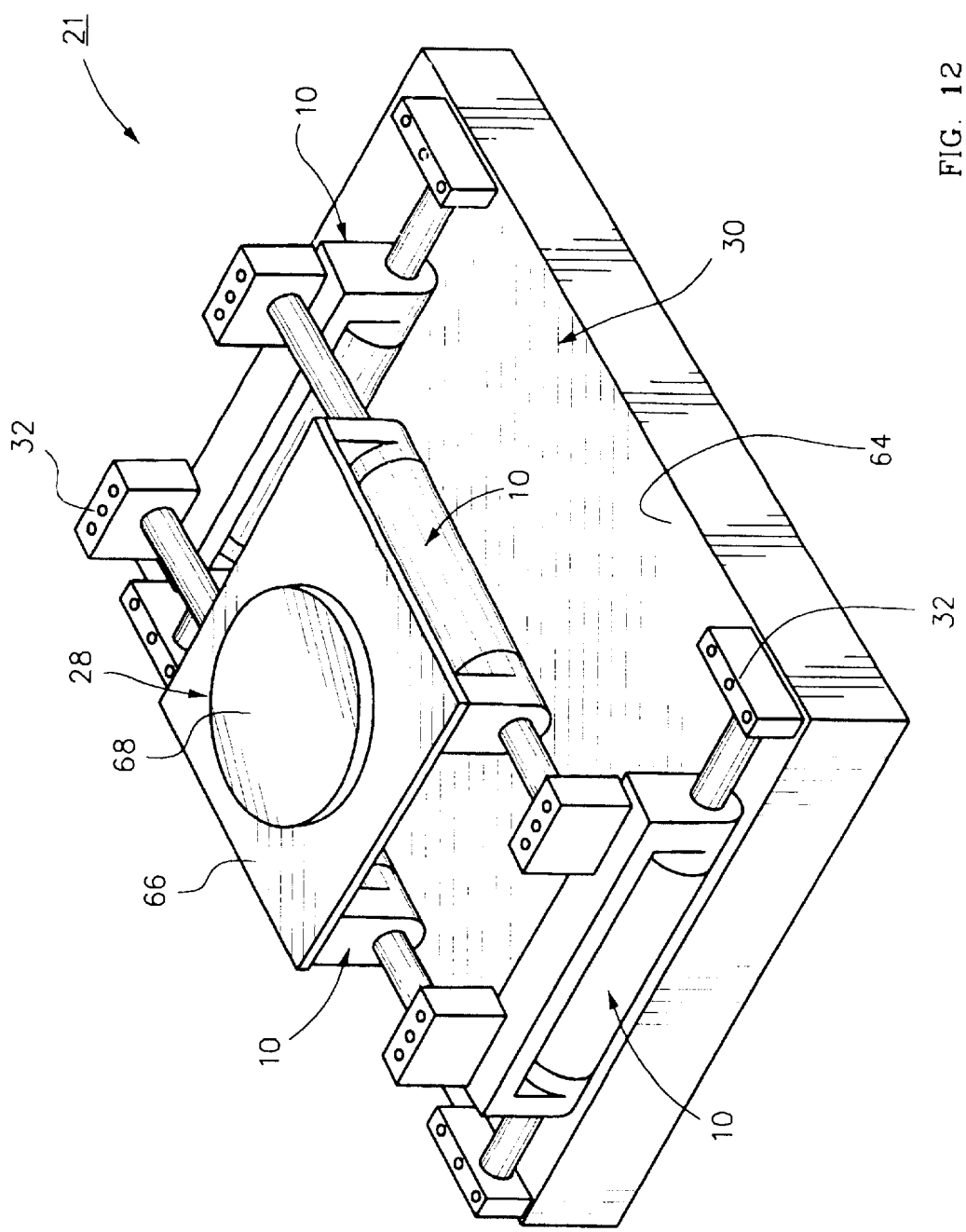
FIG. 12 is a perspective view of a stage utilizing a linear motor having features of the present invention.

FIG. 12 illustrates four motors 10 being used with a portion of an exposure apparatus 21 such as a photolithography system. In FIG. 12, the end caps 18 of two of the motors 10 are secured to the mounting surface 30, i.e. a wafer stage base 64 and the object 28 moved by motors 10 is a wafer stage 66 retaining a semiconductor wafer 68.

Figure 13:
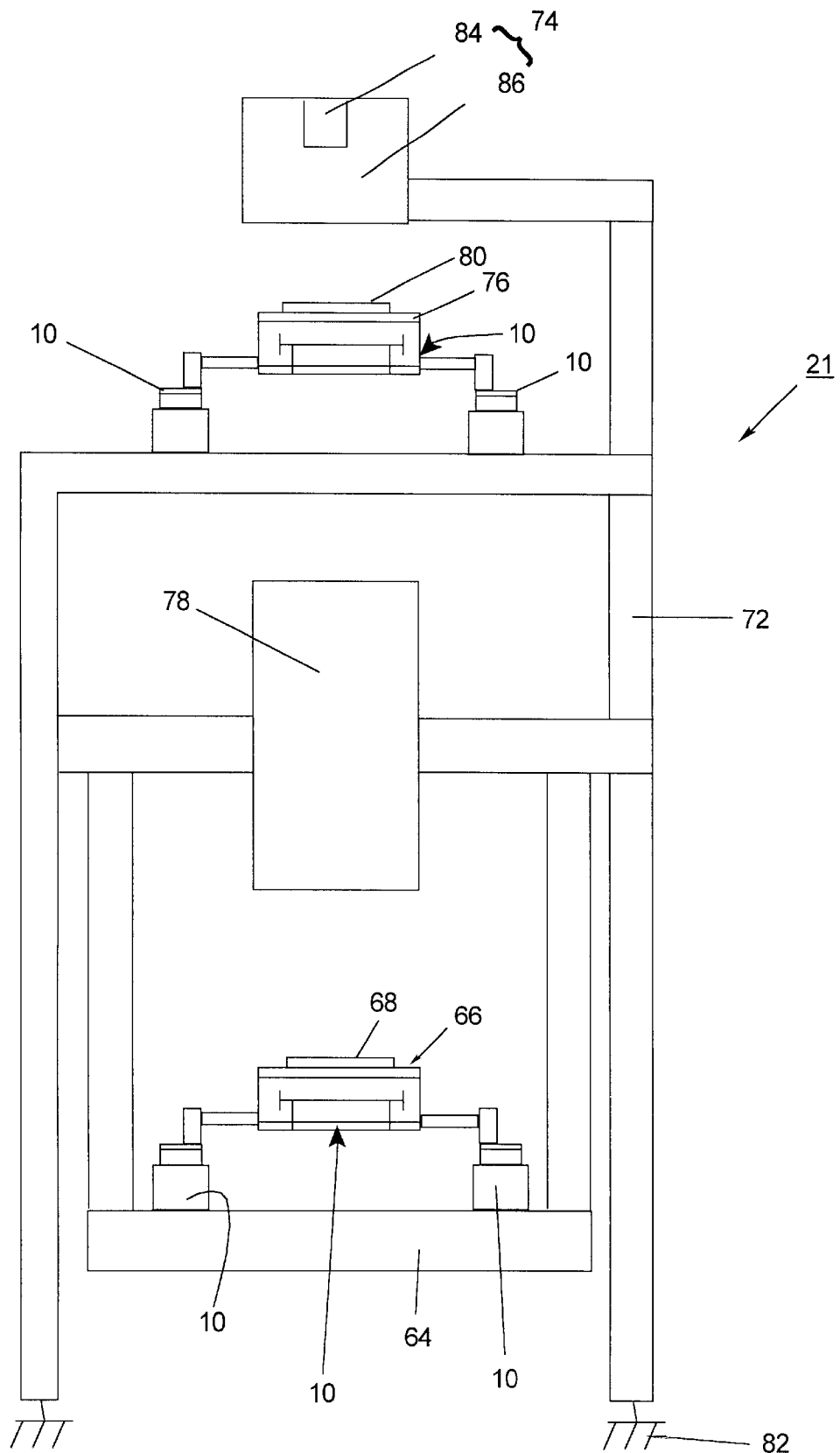
FIG. 13 is a side illustration of an exposure apparatus utilizing a linear motor having features of the present invention.

FIG. 13 is a schematic view illustrating an exposure apparatus 21 useful with the present invention. The exposure apparatus 21 includes an apparatus frame 72, an illumination system 74 (irradiation apparatus), a reticle stage 76, a lens assembly 78, and the wafer stage 66. One or more of the motors 10 provided herein can be used to move and position one or both of the stages 76, 66.

The exposure apparatus 21 is particularly useful as a lithographic device that transfers a pattern (not shown) of an integrated circuit from a first object, e.g. a reticle 80 onto a second object, e.g. the semiconductor wafer 68. The exposure apparatus 21 mounts to a base 82, i.e., a floor or the ground or some other supporting structure.

The apparatus frame 72 is rigid and supports the components of the exposure apparatus 21. The design of the apparatus frame 72 can be varied to suit the design requirements for the rest of the exposure apparatus 21. The apparatus frame 72 illustrated in FIG. 13, supports the reticle stage 76, the wafer stage 66, the lens assembly 78, and the illumination system 74 above the base 84. Alternately, for example, separate, individual structures (not shown) can be used to support the stages 76, 66, the illumination system 74 and the lens assembly 78 above the base 84.

The illumination system 74 includes an illumination source 84 and an illumination optical assembly 86. The illumination source 84 emits the beam (irradiation) of light energy. The illumination optical assembly 86 guides the beam of light energy from the illumination source 84 to the lens assembly 78. The beam illuminates selectively different portions of the reticle 80 and exposes the wafer 68. In FIG. 13, the illumination source 84 is illustrated as being supported above the reticle stage 76. Typically, however, the illumination source 84 is secured to one of the sides of the apparatus frame 72 and the energy beam from the illumination source 84 is directed to above the reticle stage 76 with the illumination optical assembly 86.

The lens assembly 78 projects and/or focuses the light passing through reticle 80 to the wafer 68. Depending upon the design of the apparatus 21, the lens assembly 78 can magnify or reduce the image illuminated on the reticle 80.

The reticle stage 76 holds and precisely positions the reticle 80 relative to the lens assembly 78 and the wafer 68. Somewhat similarly, the wafer stage 66 holds and positions the wafer 68 with respect to the projected image of the illuminated portions of the reticle 80. In the embodiment illustrated in FIG. 13, the wafer stage 66 and the reticle stage 76 are positioned by shaft-type motors 10 having features of the present invention. Depending upon the design, the apparatus 21 can also include additional servo drive units, linear motors and planar motors to move the stages 66, 76.

There are a number of different types of lithographic devices. For example, the exposure apparatus 21 can be used a scanning type photolithography system which exposes the pattern from the reticle 80 onto the wafer 68 with the reticle 80 and wafer 68 moving synchronously. In a scanning type lithographic device, the reticle 80 is moved perpendicular to an optical axis of the lens assembly 78 by the reticle stage 76 and the wafer 68 is moved perpendicular to an optical axis of the lens assembly 78 by the wafer stage 66. Scanning of the reticle 80 and the wafer 68 occurs while the reticle 80 and the wafer 68 are moving synchronously.

Alternately, the exposure apparatus 21 can be a step-and-repeat type photolithography system that exposes the reticle 80 while the reticle 80 and the wafer 68 are stationary. In the step and repeat process, the wafer 68 is in a constant position relative to the reticle 80 and the lens assembly 78 during the exposure of an individual field. Subsequently, between consecutive exposure steps, the wafer 68 is consecutively moved by the wafer stage 66 perpendicular to the optical axis of the lens assembly 78 so that the next field of the semiconductor wafer 68 is brought into position relative to the lens assembly 78 and the reticle 80 for exposure. Following this process, the images on the reticle 80 are sequentially exposed onto the fields of the wafer 68 so that the next field of the semiconductive wafer 68 is brought into position relative to the lens assembly 78 and the reticle 80.

However, the use of the exposure apparatus 21 provided herein is not limited to a photolithography system for semiconductor manufacturing. The exposure apparatus 21, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern by closely locating a mask and a substrate without the use of a lens assembly. Additionally, the present invention provided herein can be used in other devices, including other semiconductor processing equipment, elevators, electric razors, machine tools, metal cutting machines, inspection machines and disk drives.

The illumination source 84 can be g-line (436 nm), i-line (365 nm), KrF excimer laser (248 nm), ArF excimer laser (193 nm) and $F_2$ laser (157 nm). Alternately, the illumination source 84 can also use charged particle beams such as x-ray and electron beam. For instance, in the case where an electron beam is used, thermionic emission type lanthanum hexaboride ($LaB_6$) or tantalum (Ta) can be used as an electron gun. Furthermore, in the case where an electron beam is used, the structure could be such that either a mask is used or a pattern can be directly formed on a substrate without the use of a mask.

In terms of the magnification of the lens assembly 78 included in the photolithography system, the lens assembly 78 need not be limited to a reduction system. It could also be a 1× or magnification system.

With respect to a lens assembly 78, when far ultra-violet rays such as the excimer laser is used, glass materials such as quartz and fluorite that transmit far ultra-violet rays is preferable to be used. When the $F_2$ type laser or x-ray is used, the lens assembly 78 should preferably be either catadioptric or refractive (a reticle should also preferably be a reflective type), and when an electron beam is used, electron optics should preferably consist of electron lenses and deflectors. The optical path for the electron beams should be in a vacuum.

Also, with an exposure device that employs vacuum ultra-violet radiation (VUV) of wavelength 200 nm or lower, use of the catadioptric type optical system can be considered. Examples of the catadioptric type of optical system include the disclosure Japan Patent Application Disclosure No.8-171054 published in the Official Gazette for Laid-Open Patent Applications and its counterpart U.S. Pat. No, 5,668,672, as well as Japan Patent Application Disclosure No.10-20195 and its counterpart U.S. Pat. No. 5,835,275. In these cases, the reflecting optical device can be a catadioptric optical system incorporating a beam splitter and concave mirror. Japan Patent Application Disclosure No.8-334695 published in the Official Gazette for Laid-Open Patent Applications and its counterpart U.S. Pat. No. 5,689,377 as well as Japan Patent Application Disclosure No.10-3039 and its counterpart U.S. Pat. Application Ser. No. 873,605 (Application Date: Jun. 12, 1997 also use a reflecting-refracting type of optical system incorporating a concave mirror, etc., but without a beam splitter, and can also be employed with this invention. As far as is permitted, the disclosures in the above-mentioned U.S. patents, as well as the Japan patent applications published in the Official Gazette for Laid-Open Patent Applications are incorporated herein by reference.

Further, in photolithography systems, when linear motors (see U.S. Pat. Nos. 5,623,853 or 5,528, 118) are used in a wafer stage or a mask stage, the linear motors can be either an air levitation type employing air bearings or a magnetic levitation type using Lorentz force or reactance force. Additionally, the stage could move along a guide, or it could be a guideless type stage which uses no guide. As far as is permitted, the disclosures in U.S. Pat. Nos. 5,623,853 and 5,528,118 are incorporated herein by reference.

Alternatively, one of the stages could be driven by a planar motor, which drives the stage by electromagnetic force generated by a magnet unit having two-dimensionally arranged magnets and an armature coil unit having two-dimensionally arranged coils in facing positions. With this type of driving system, either one of the magnet unit or the armature coil unit is connected to the stage and the other unit is mounted on the moving plane side of the stage.

Movement of the stages as described above generates reaction forces which can affect performance of the photolithography system. Reaction forces generated by the wafer (substrate) stage motion can be mechanically released to the floor (ground) by use of a frame member as described in U.S. Pat. No. 5,528,118 and published Japanese Patent Application Disclosure No. 8-166475. Additionally, reaction forces generated by the reticle (mask) stage motion can be mechanically released to the floor (ground) by use of a frame member as described in U.S. Pat. No. 5,874,820 and published Japanese Patent Application Disclosure No. 8-330224. As far as is permitted, the disclosures in U.S. Pat. Nos. 5,528,118 and 5,874,820 and Japanese Patent Application Disclosure No. 8-330224 are incorporated herein by reference.

As described above, a photolithography system according to the above described embodiments can be built by assembling various subsystems, including each element listed in the appended claims, in such a manner that prescribed mechanical accuracy, electrical accuracy and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, total adjustment is performed to make sure that every accuracy is maintained in the complete photolithography system. Additionally, it is desirable to manufacture an exposure system in a clean room where the temperature and cleanliness are controlled.

Figure 14:
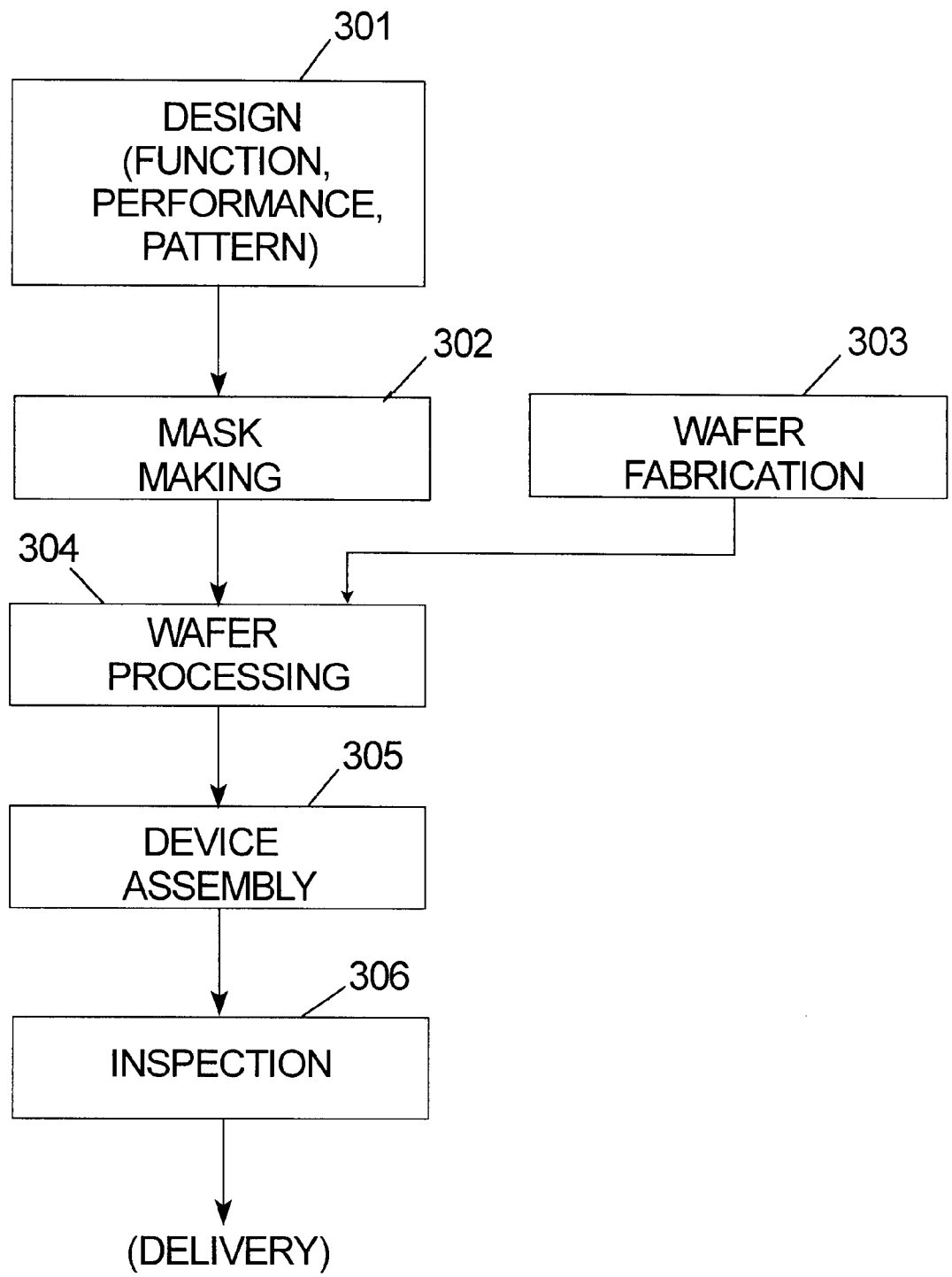
FIG. 14 is a flow chart that outlines a process for manufacturing a device in accordance with the present invention.

Further, semiconductor devices can be fabricated using the above described systems, by the process shown generally in FIG. 14. In step 301 the device's function and performance characteristics are designed. Next, in step 302, a mask (reticle) having a pattern is designed according to the previous designing step, and in a parallel step 303 a wafer is made from a silicon material. The mask pattern designed in step 302 is exposed onto the wafer from step 303 in step 304 by a photolithography system described hereinabove in accordance with the present invention. In step 305 the semiconductor device is assembled (including the dicing process, bonding process and packaging process), then finally the device is inspected in step 306.

Figure 15:
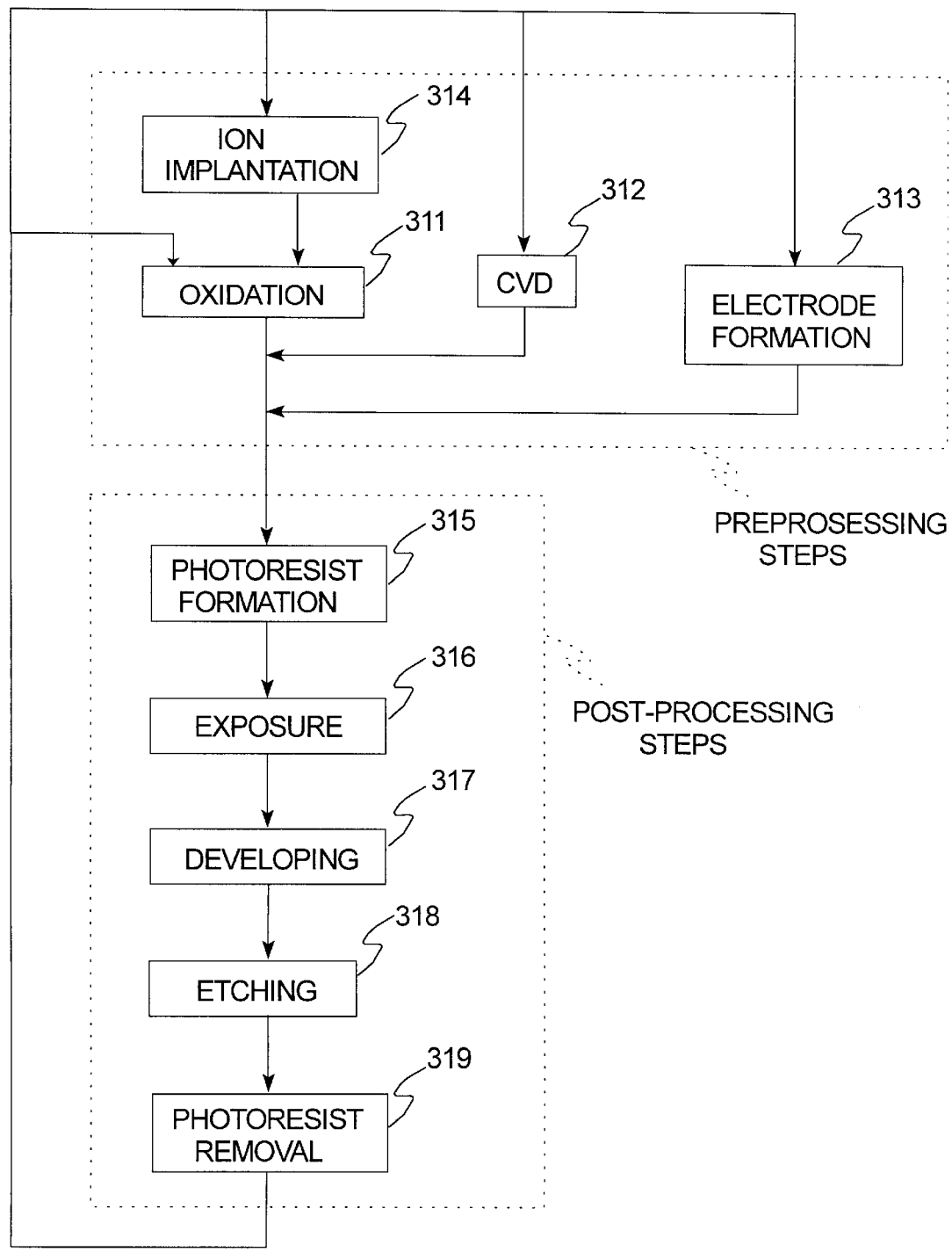
FIG. 15 is a flow chart that outlines device processing in more detail.

FIG. 15 illustrates a detailed flowchart example of the above-mentioned step 304 in the case of fabricating semiconductor devices. In FIG. 15, in step 311 (oxidation step), the wafer surface is oxidized. In step 312 (CVD step), an insulation film is formed on the wafer surface. In step 313

(electrode formation step), electrodes are formed on the wafer by vapor deposition. In step 314 (ion implantation step), ions are implanted in the wafer. The above mentioned steps 311–314 form the preprocessing steps for wafers during wafer processing, and selection is made at each step according to processing requirements.

At each stage of wafer processing, when the above-mentioned preprocessing steps have been completed, the following post-processing steps are implemented. During post-processing, firstly, in step 315 (photoresist formation step), photoresist is applied to a wafer. Next, in step 316, (exposure step), the above-mentioned exposure device is used to transfer the circuit pattern of a mask (reticle) to a wafer. Then, in step 317 (developing step), the exposed wafer is developed, and in step 318 (etching step), parts other than residual photoresist (exposed material surface) are removed by etching. In step 319 (photoresist removal step), unnecessary photoresist remaining after etching is removed.

Multiple circuit patterns are formed by repetition of these preprocessing and post-processing steps.

Importantly, with the present invention, the magnet arrays 20 provided herein have an improved flux/mass ratio. In some embodiments, the magnet array 20 has increased flux density for a given mass of magnet array 20. Alternately, in some embodiments, the magnet array 20 has a decreased magnet mass for a given flux density.

While the particular magnet arrays 20 and motor 10 as herein shown and disclosed in detail are fully capable of obtaining the objects and providing the advantages herein before stated, it is to be understood that they are merely illustrative of embodiments of the invention and that no limitations are intended to the details of construction or design herein shown other than as described in the appended claims.

What is claimed is:

1. A magnet array adapted for use with a coil array of a motor, the magnet array having an array axis, the magnet array comprising:
    a magnetic, first section including a plurality of segments which are positioned so that the polarization of the first section is substantially transverse to the array axis;
    wherein at least one of the segments has a substantially wedge shaped cross-section and at least one of the segments is substantially linearly polarized.

2. The magnet array of claim 1 wherein at least one of the segments is made of a high energy product, magnetic material.

3. The magnet array of claim 1 including a magnetic, second section positioned near the first section along the array axis, the second section having substantially axial polarization relative to the array axis.

4. The magnet array of claim 3 including a plurality of alternating first sections and second sections positioned substantially side-by-side along the array axis.

5. The magnet array of claim 1 wherein the first section is substantially right cylindrical shaped and the polarization of the first section is substantially radial to the array axis.

6. The magnet array of claim 5 wherein the first section includes a plug which is substantially encircled by the plurality of segments, the plug being made of a magnetic material.

7. The magnet array of claim 1 wherein the first section is substantially tubular shaped and the polarization of the first section is substantially radial to the array axis.

8. A linear motor including the magnet array of claim 1 and a coil array positioned near the magnet array.

9. An exposure apparatus including the linear motor of claim 8.

10. An object on which an image has been formed by the exposure apparatus of claim 9.

11. A magnet array adapted for use with a coil array of a motor, the magnet array having an array axis, the magnet array comprising:
    a magnetic, first section including a plurality of segments which are positioned so that the polarization of the first section is substantially transverse to the array axis;
    wherein the first section includes a first side, an opposed second side, and a first channel which extends from the first side into only a portion of the first section, the first channel being substantially centered on the array axis.

12. The magnet array of claim 11 including a second channel which extends from the second side into only a portion of the first section, the second channel being substantially centered on the array axis.

13. A magnet array adapted for use with a coil array of a motor, the magnet array including an array axis, the magnet array comprising:
    a first section made of a high energy product, rare earth, magnetic material, the first section having substantially transverse polarization relative to the array axis;
    wherein the first section includes a plurality of segments which are positioned so that the polarization of first section is substantially transverse to the array axis;
    wherein at least one of the segments has a substantially wedge shaped cross-section.

14. The magnet array of claim 13 including a magnetic second section positioned near the first section along the array axis, the second section having substantially axial polarization relative to the array axis.

15. The magnet array of claim 14 including a plurality of alternating first sections and second sections positioned substantially side-by-side along the array axis.

16. The magnet array of claim 13 wherein the first section is substantially tubular shaped and the polarization of the first section is substantially radial to the array axis.

17. The magnet array of claim 13 wherein the first section is substantially right cylindrical shaped and the polarization of the first section is substantially radial to the array axis.

18. A motor including the magnet array of claim 13 and a coil array positioned near the magnet array.

19. An exposure apparatus including the motor of claim 18.

20. An object on which an image has been formed by the exposure apparatus of claim 19.

21. A magnet array adapted for use with a coil array of a motor, the magnet array including an array axis, the magnet array comprising:
    a plurality of first sections made of a high energy product, rare earth, magnetic material, each first section having substantially transverse polarization relative to the array axis;
    a plurality of magnetic second sections, each second section having substantially axial polarization relative to the array axis;
    wherein the first sections and second sections are alternately positioned substantially side-by-side along the array axis;
    wherein at least one of the sections includes a first side, an opposed second side, and a first channel which extends from the first side into only a portion of the section, the first channel being substantially centered on the array axis.

22. A magnet array adapted for use with a coil array of a motor, the magnet array including an array axis, the magnet array comprising:

a plurality of magnetic sections positioned along the array axis, each section including a first side and an opposed second side, at least one of the sections including a first channel which extends from the first side into only a portion of the section, the channel being substantially centered on the array axis.

23. The magnet array of claim 22 wherein at least one of the sections includes a second channel which extends from the second side into only a portion of the section, the second channel being substantially centered on the array axis.

24. The magnet array of claim 23 wherein each section includes a first channel and a second channel.

25. The magnet array of claim 22 wherein each section includes a first channel.

26. The magnet array of claim 22 wherein each section is substantially tubular shaped.

27. The magnet array of claim 22 wherein each section is substantially right cylindrical shaped.

28. The magnet array of claim 22 wherein at least one of the sections is a magnetic axial section and at least one of the sections is a magnetic, transverse section, the axial section having substantially axial polarization relative to the array axis, and the transverse section having substantially transverse polarization relative to the array axis.

29. A linear motor including the magnet array of claim 22 and a coil array positioned near the magnet array.

30. An exposure apparatus including the linear motor of claim 29.

31. An object on which an image has been formed by the exposure apparatus of claim 30.

32. A method for manufacturing a magnet array adapted for use with a coil array, the magnet array having an array axis, the method comprising the step of:

manufacturing a magnetic first section having a polarization which is substantially transverse to the array axis, the first section being made of a high energy product, rare earth, magnetic material; the first section including a plurality of segments;

wherein at least one of the segments has a substantially wedge shaped cross-section.

33. A method for making a linear motor using an electromagnetic force, the method comprising the steps of:

providing a magnet array manufactured by the method of claim 32; and disposing a coil array movably relative to the magnet array by said electromagnetic force.

34. A method for making an exposure apparatus that forms an image formed on a first object on a second object, the method comprising the steps of:

providing an irradiation apparatus that irradiates the first object supported by a first stage with radiation to form the image on the second object; and connecting the linear motor manufactured by the method of claim 33 to the first stage as a driving force for moving the first object.

35. A method for making a device utilizing the exposure apparatus made by the method of claim 34.

36. A method for making an exposure apparatus that forms an image on an object, comprising the steps of:

providing an irradiation apparatus that irradiates the object supported by a stage with radiation to form the image on the object; and connecting the linear motor manufactured by the method of claim 33 to the stage as a driving force for moving the object.

37. A method of making a device utilizing the exposure apparatus made by the method of claim 36.

38. A method for manufacturing a magnet array adapted for use with a coil array, the magnet array having an array axis, the method comprising the steps of:

providing a plurality of magnetic, segments; and organizing the plurality of segments to create a first section having a polarization which is substantially transverse to the array axis;

wherein the step of providing a plurality of segments includes the step of providing at least one segment having a substantially wedge shaped cross-section and a substantially linear polarization.

39. The method of claim 38 including the step of positioning a magnetic, second section adjacent to the first section, the section having substantially axial polarization relative to the array axis.

40. A method for making a linear motor using an electromagnetic force, the method comprising the steps of:

providing a magnet array manufactured by the method of claim 38; and disposing a coil array movably relative to the magnet array by said electromagnetic force.

41. A method for making an exposure apparatus that forms an image formed on a first object on a second object, the method comprising the steps of:

providing an irradiation apparatus that irradiates the first object supported by a first stage with radiation to form the image on the second object; and connecting the linear motor manufactured by the method of claim 40 to the first stage as a driving force for moving the first object.

42. A method for making a device utilizing the exposure apparatus made by the method of claim 41.

43. A method for making an exposure apparatus that forms an image on an object, comprising the steps of:

providing an irradiation apparatus that irradiates the object supported by a stage with radiation to form the image on the object; and connecting the linear motor manufactured by the method of claim 40 to the stage as a driving force for moving the object.

44. A method of making a device utilizing the exposure apparatus made by the method of claim 43.

45. A method for creating a magnet array adapted for use with a coil array, the magnet array including an array axis, the method comprising the steps of:

providing a plurality of magnetic sections, each section including a first side and a second side;

creating a first channel in at least one of the sections, the first channel extending from the first side into only a portion of the section; and positioning the sections side-by-side along the array axis.

46. The method of claim 45 including the step of creating a second channel in at least one of the sections, the second channel extending from the second side into only a portion of the section, the second channel being substantially centered on the array axis.

47. A method for making a linear motor using an electromagnetic force, the method comprising the steps of:

providing a magnet array manufactured by the method of claim 45; and disposing a coil array movably relative to the magnet array by said electromagnetic force.

48. A method for making an exposure apparatus that forms an image formed on a first object on a second object, the method comprising the steps of:

providing an irradiation apparatus that irradiates the first object supported by a first stage with radiation to form the image on the second object; and connecting the linear motor manufactured by the method of claim 47 to the first stage as a driving force for moving the first object.

49. A method for making a device utilizing the exposure apparatus made by the method of claim 48.

50. A method for making an exposure apparatus that forms an image on an object, comprising the steps of:

providing an irradiation apparatus that irradiates the object supported by a stage with radiation to form the image on the object; and connecting the linear motor manufactured by the method of claim 47 to the stage as a driving force for moving the object.

51. A method of making a device utilizing the exposure apparatus made by the method of claim 50.

52. A magnet array adapted for use with a coil array of a motor, the magnet array having an array axis, the magnet array comprising:

a magnetic, first section including a plurality of segments, at least one of the segments has a substantially wedge shaped cross-section.

53. The magnet array of claim 52 wherein at least one of the segments is substantially linearly polarized.

54. The magnet array of claim 53 wherein the plurality of segments are positioned so that the polarization of the first section is substantially transverse to the array axis.

55. The magnet array of claim 52 including a magnetic, second section positioned near the first section along the array axis, the second section having substantially axial polarization relative to the array axis.

56. The magnet array of claim 55 including a plurality of alternating first sections and second sections positioned substantially side-by-side along the array axis.

57. The magnet array of claim 52 wherein the first section includes a first side, an opposed second side, and a first channel which extends from the first side into only a portion of the first section, the first channel being substantially centered on the array axis.

58. The magnet array of claim 52 wherein the first section is substantially tubular shaped.

59. The magnet array of claim 59 wherein the first section includes a plug which is substantially encircled by the plurality of segments, the plug being made of a magnetic material.

60. A linear motor including the magnet array of claim 52 and a coil array that encircles the magnet array.

61. An exposure apparatus including the linear motor of claim 60.

62. An object on which an image has been formed by the exposure apparatus of claim 61.

63. A magnet array adapted for use with a coil array of a motor, the magnet array having an array axis, the magnet array comprising:

a substantially tubular shaped, magnetic, first section, the first section having a length along the array axis; and plug positioned within the first section, the plug having a length along the array axis, wherein the length of the plug is approximately equal to the length of the first section.

64. The magnet array of claim 63 wherein the first section includes a plurality of segments.

65. A magnet array of claim 63 wherein at least one of the segments has a substantially wedge shaped cross-section.

66. The magnet array of claim 65 wherein at least one of the segments is substantially linearly polarized.

67. The magnet array of claim 65 wherein the plurality of segments are positioned so that the polarization of the first section is substantially transverse to the array axis.

68. The magnet array of claim 67 including a magnetic, second section positioned near the first section along the array axis, the second section having substantially axial polarization relative to the array axis.

69. The magnet array of claim 68 including a plurality of alternating first sections and second sections positioned substantially side-by-side along the array axis.

70. A linear motor including the magnet array of claim 63 and a coil array that encircles the magnet array.

71. An exposure apparatus including the linear motor of claim 70.

72. An object on which an image has been formed by the exposure apparatus of claim 71.

73. A motor comprising:

a tubular shaped coil array; and a magnet array that fits within the coil array, the magnet array having an array axis, the magnet array including a magnetic, first section having a polarization that is substantially transverse to the array axis and a magnetic, second section positioned adjacent to the first section along the array axis, the second section having substantially axial polarization relative to the array axis.

74. The linear motor of claim 73 wherein the first section includes a plurality of segments, at least one of the segments has a substantially wedge shaped cross-section.

75. The linear motor of claim 73 including a plurality of alternating first sections and second sections positioned substantially side-by-side along the array axis.

76. The linear motor of claim 73 wherein the first section includes a first side, an opposed second side, and a first channel which extends from the first side into only a portion of the first section, the first channel being substantially centered on the array axis.

77. The linear motor of claim 73 wherein an outer perimeter of the first section is the north pole of the first section and a side of the second section adjacent to the first section is the north pole of the second section.

78. The linear motor of claim 73 wherein an outer perimeter of the first section is the south pole of the first section and a side of the second section adjacent to the first section is the south pole of the second section.

79. An exposure apparatus including the linear motor of claim 73.

80. An object on which an image has been formed by the exposure apparatus of claim 79.

81. A magnet array adapted for use with a coil array of a motor, the magnet array having an array axis, the magnet array comprising:

a first section made of a magnetic material, the first section having substantially transverse polarization relative to the array axis; and a plug that is substantially encircled by the magnetic material of the first section, the plug being made of a magnetic material.

82. The magnet array of claim 81, including a magnetic, second section position near the first section along the array axis, the second section having substantially axial polarization relative to the array axis.

83. A linear motor including the magnet array of claim 81 and a coil array that encircles the magnet array.

84. An exposure apparatus including the linear motor of claim 83.

85. An object on which an image has been formed by the exposure apparatus of claim 84.

* * * * *

UNITED STATES PATENT AND TRADEMARK OFFICE
CERTIFICATE OF CORRECTION

PATENT NO. : 6,313,551 B1
DATED : November 6, 2001
INVENTOR(S) : Hazelton

It is certified that error appears in the above-identified patent and that said Letters Patent is hereby corrected as shown below:

Column 15,
Line 49, please delete "claim 59" and replace it with -- claim 52 --.
Line 64, please add -- a -- before the phrase "plug positioned within the first section,".

Signed and Sealed this

Eleventh Day of June, 2002

*Attest:*

JAMES E. ROGAN
*Attesting Officer*   *Director of the United States Patent and Trademark Office*